United States Patent [19]

Cheng et al.

[11] Patent Number: 5,557,024

[45] Date of Patent: *Sep. 17, 1996

[54] PROCESS FOR PREPARING SHORT CHAIN ALKYL AROMATIC COMPOUNDS

[75] Inventors: Jane C. Cheng, Clarksburg, N.J.; Anthony D. Fung, Wilmington, Del.; Donald J. Klocke, Somerdale; Stephen L. Lawton, Pitman, both of N.J.; Daria N. Lissy, Glen Mills, Pa.; Wieslaw J. Roth, Sewell; C. Morris Smith, Princeton, both of N.J.; Dennis E. Walsh, Richboro, Pa.

[73] Assignee: Mobil Oil Corporation, Fairfax, Va.

[ * ] Notice: The term of this patent shall not extend beyond the expiration date of Pat. No. 5,453,554.

[21] Appl. No.: 452,919

[22] Filed: May 30, 1995

Related U.S. Application Data

[63] Continuation of Ser. No. 249,609, May 26, 1994, Pat. No. 5,453,554, which is a continuation-in-part of Ser. No. 51,952, Apr. 26, 1993, Pat. No. 5,362,697.

[51] Int. Cl.[6] .................................................. C07C 2/66
[52] U.S. Cl. ........................ 585/467; 585/449; 585/453
[58] Field of Search .................................. 585/467, 468, 585/475, 449

[56] References Cited

U.S. PATENT DOCUMENTS

| | | | |
|---|---|---|---|
| 5,202,516 | 4/1993 | Lee et al. | 585/475 |
| 5,243,116 | 9/1993 | Lee et al. | 585/475 |
| 5,324,877 | 6/1994 | West et al. | 586/467 |
| 5,329,059 | 7/1994 | Marler | 585/475 |
| 5,334,795 | 8/1994 | Chu et al. | 585/467 |
| 5,362,697 | 11/1994 | Fung et al. | 502/71 |
| 5,371,310 | 12/1994 | Bennett et al. | 585/467 |

*Primary Examiner*—Glenn A. Caldarola
*Attorney, Agent, or Firm*—Ronald A. Bleeker; P. W. Roberts

[57] ABSTRACT

Relatively short chain alkyl aromatic compounds are prepared by alkylating an alkylatable aromatic compound with a relatively short chain alkylating agent under sufficient reaction conditions in the presence of a catalyst comprising zeolite MCM-56. The liquid phase syntheses of ethylbenzene and cumene are particular examples of such MCM-56 catalyzed reactions.

14 Claims, 8 Drawing Sheets

PROCESS FOR PREPARING SHORT CHAIN ALKYL AROMATIC COMPOUNDS

CROSS-REFERENCE TO RELATED APPLICATIONS

This application is a continuation of U.S. patent application Ser. No. 08/249,609, filed May 26, 1994, now U.S. Pat. No. 5,453,554, which is a continuation-in-part of U.S. patent application Ser. No. 08/051,952, filed Apr. 26, 1993, now U.S. Pat. No. 5,362,697.

BACKGROUND

There is provided a process for preparing short chain alkyl aromatic compounds by alkylating an aromatic compound with an alkylating agent employing a particular synthetic porous crystalline material, designated MCM-56, as a catalyst.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties. Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and silicon atoms to oxygen atoms is 1:2. The electrovalence of the tetrahedra containing the Group IIIA element, e.g., aluminum, is balanced by the inclusion in the crystal of a cation, e.g., an alkali metal or an alkaline earth metal cation. This can be expressed wherein the ratio of the Group IIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite Z (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); zeolite ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865; and 4,104,294 describe crystalline silicates of varying alumina and metal content.

U.S. Pat. No. 4,439,409 refers to a composition of matter named PSH-3 and its synthesis from a reaction mixture containing hexamethyleneimine, an organic compound which acts as directing agent for synthesis of the presently used MCM-56. A composition of matter appearing to be identical to the PSH-3 of U.S. Pat. No. 4,439,409, but with additional structural components, is taught in European Patent Application 293,032. Hexamethyleneimine is also used for synthesis of MCM-22 in U.S. Pat. No. 4,954,325; MCM-35 in U.S. Pat. No. 4,981,663; MCM-49 in U.S. Pat. No. 5,236,575; and a ZSM-12 material in U.S. Pat. No. 5,021,141. A composition of matter referred to as zeolite SSZ-25 is taught in U.S. Pat. No. 4,826,667 and European Patent Application 231,860, said zeolite being synthesized from a reaction mixture containing an adamantane quaternary ammonium ion.

The alkylation of aromatic hydrocarbons with an olefin in the presence of a zeolite having uniform pore openings of from about 6 to about 15 Angstrom units is described in U.S. Pat. No. 2,904,607. U.S. Pat. No. 3,251,897 describes the liquid phase alkylation of aromatic hydrocarbons in the presence of X- or Y-type zeolites, specifically such zeolites wherein the cation is a rare earth metal species and/or hydrogen. U.S. Pat. Nos. 3,751,504 and 3,751,506 describe the vapor phase alkylation of aromatic hydrocarbons with olefins, e.g., benzene with ethylene, in the presence of catalyst comprising, for example, ZSM-5.

U.S. Pat. Nos. 3,631,120 and 3,641,177, describe a liquid phase process for the alkylation of aromatic hydrocarbons with olefins in the presence of certain zeolites.

U.S. Pat. Nos. 4,962,256; 4,992,606; 4,954,663; 5,001,295; and 5,043,501, each incorporated herein by reference in its entirety, teach alkylation of aromatic compounds with various alkylating agents over catalyst comprising a particular crystalline material, such as PSH-3 or MCM-22. U.S. Pat. No. 4,962,256 describes preparing long chain alkylaromatic compounds by alkylating an aromatic compound with a long chain alkylating agent. U.S. Pat. No. 4,992,606 describes preparing short chain alkylaromatics by alkylating an aromatic compound with a short chain alkylating agent. U.S. Pat. No. 4,954,663 teaches alkylation of phenols, and U.S. Pat. No. 5,001,295 teaches alkylation of naphthalene. U.S. Pat. No. 5,043,501 describes preparation of 2,6-dimethylnaphthalene.

U.S. Pat. Nos. 3,755,483 and 4,393,262 disclose the vapor phase reaction of propylene with benzene in the presence of zeolite ZSM-12, to product isopropylbenzene.

U.S. Pat. No. 4,469,908 discloses the alkylation of aromatic hydrocarbons with relatively short chain alkylating agents having from 1 to 5 carbon atoms employing ZSM-12 as alkylation catalyst.

Harper et al. have described a catalytic alkylation of benzene with propylene over a crystalline zeolite (*Petro-*

*chemical Preprints*, American Chemical Society, vol. 22, no. 3, 1084 (1977)). Extensive kinetic and catalyst aging studies were conducted with a rare earth exchanged Y-type zeolite (REY) catalyst.

Ethylbenzene is a valuable commodity chemical which is currently used on a large scale industrially for the production of styrene monomer. Ethylbenzene may be produced by a number of different chemical processes but one process which has achieved a significant degree of commercial success is the vapor phase alkylation of benzene with ethylene in the presence of a solid, acidic ZSM-5 zeolite catalyst. In the production of ethylbenzene by this process, ethylene is used as the alkylating agent and is reacted with benzene in the presence of the catalyst at temperatures which vary between the critical temperature of benzene up to 900° F. (about 480° C.) at the reactor inlet. The reactor bed temperature may be as much as 150° F. (about 85° C.) above the reactor inlet temperature and typical temperatures for the benzene/ethylene reaction vary from 600° to 900° F. (315° to 480° C.), but are usually maintained above about 700° F. (about 370° C.) in order to keep the content of the more highly alkylated benzenes such as diethylbenzene at an acceptably low level. Pressures typically vary from atmospheric to 3000 psig (about 20785 kPa abs) with a molar ratio of benzene to ethylene from about 1:1 to 25:1, usually about 5:1 (benzene:ethylene). Space velocity in the reaction is high, usually in the range of 1 to 6, typically 2 to 5, WHSV based on the ethylene flow, with the benzene space velocity varying accordingly, in proportion to the ratio of the reactants. The products of the reaction include ethylbenzene which is obtained in increasing proportions as temperature increases together with various polyethylbenzenes, principally diethylbenzene (DIEB) which also are produced in increasing amounts as reaction temperature increases. Under favorable operating conditions on the industrial scale, an ethylene conversion in excess of 99.8 weight percent may be obtained at the start of the cycle.

In a commercial operation of this process, the polyalkylated benzenes, including both polymethylated and polyethylated benzenes are recycled to the alkylation reactor in which the reaction between the benzene and the ethylene takes place. By recycling the by-products to the alkylation reaction, increased conversion is obtained as the polyethylated benzenes (PEB) are converted to ethylbenzene (EB). In addition, the presence of the PEB during the alkylation reaction reduces formation of these species through equilibration of the components because at a given feed composition and under specific operating conditions, the PEB recycle will reach equilibrium at a certain level. This commercial process is known as the Mobil/Badger process and is described in more detail in an article by Francis G. Dwyer, entitled "Mobil/Badger Ethylbenzene Process-Chemistry and Catalytic Implications", appearing on pages 39–50 of a book entitled *Catalysis of Organic Reactions*, William R. Moser, ed., Marcel Dekker, Inc. (1981).

Ethylbenzene production processes are described in U.S. Pat. No. 3,751,504 (Keown); U.S. Pat. No. 4,547,605 (Kresge); and U.S. Pat. No. 4,016,218 (Haag); reference is made to these patents for a detailed description of such processes. The process described in U.S. Pat. No. 3,751,504 is of particular note since it includes a separate transalkylation step in the recycle loop which is effective for converting a significant proportion of the more highly alkylated products to the desired ethylbenzene product. Other processes for the production of ethylbenzene are disclosed in U.S. Pat. No. 4,169,111 (Wight) and U.S. Pat. No. 4,459,426 (Inwood), in both of which a preference for large pore size zeolites such as zeolite Y is expressed, in distinction to the intermediate pore size zeolites used in the processes described in the Keown, Kresge, and Haag patents. U.S. Pat. No. 3,755,483 (Burress) describes a process for the production of ethylbenzene using zeolite ZSM-12 as the alkylation catalyst.

Ethylbenzene (EB) can be synthesized from benzene and ethylene ($C_2=$) over a variety of zeolitic catalysts in either the liquid phase or in the vapor phase. An advantage of a liquid phase process is its low operating temperature and the resulting low content of by-products.

U.S. Pat. No. 4,891,458 describes the liquid phase synthesis of ethylbenzene and cumene with zeolite beta.

U.S. Pat. No. 5,149,894 describes the liquid phase synthesis of ethylbenzene and cumene with a crystalline aluminosilicate material designated SSZ-25.

Copending U.S. application Ser. No. 07/967,954, filed Oct. 27, 1992, now U.S. Pat. No. 5,334,795, describes the liquid phase synthesis of ethylbenzene with a crystalline aluminosilicate material designated MCM-22.

Copending U.S. application Ser. No. 08/078,369, filed Jun. 16, 1993, now U.S. Pat. No. 5,371,310, describes the synthesis of short chain alkylaromatics with a crystalline aluminosilicate material designated MCM-49.

SUMMARY

There is provided a process for preparing short chain alkyl aromatic compounds, said process comprising contacting at least one alkylatable aromatic compound with at least one alkylating agent possessing an alkylating aliphatic group having from 1 to 5 carbon atoms under sufficient reaction conditions and in the presence of a catalyst to provide an alkylated aromatic product possessing at least one alkyl group derived from said alkylating agent, said catalyst comprising MCM-56, a synthetic porous crystalline material characterized by an X-ray diffraction pattern substantially as set forth hereinafter.

BRIEF DESCRIPTION OF THE DRAWINGS

FIG. 5(*b*) shows the X-ray diffraction pattern of the Example 3 product.

FIG. 5(*c*) shows the X-ray diffraction pattern of the Example 4 product.

FIG. 5(*d*) shows the X-ray diffraction pattern of the Example 5 product.

EMBODIMENTS

Figure 1:
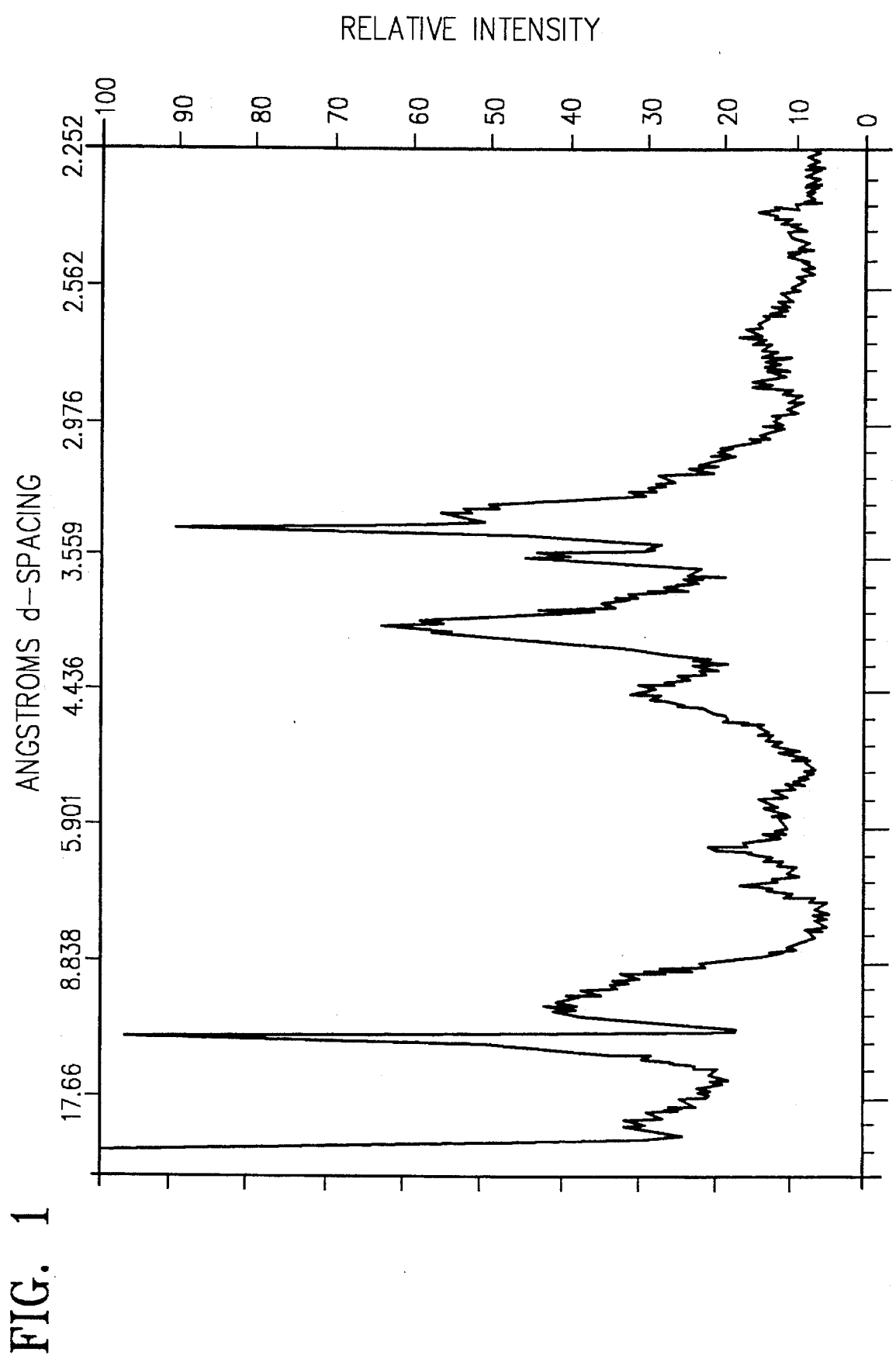
FIG. 1 shows the X-ray diffraction pattern of the dried product MCM-56 of Example 1.

The entire contents of application Ser. No. 08/051,952, filed Apr. 26, 1993, teaching MCM-56, are incorporated herein by reference.

The term "aromatic" in reference to the alkylatable compounds which are useful herein is to be understood in accordance with its art-recognized scope which includes alkyl substituted and unsubstituted mono- and polynuclear compounds. Compounds of an aromatic character which possess a hetero atom are also useful provided they do not act as catalyst poisons under the reaction conditions selected.

Substituted aromatic compounds which can be alkylated herein must possess at least one hydrogen atom directly bonded to the aromatic nucleus. The aromatic rings can be substituted with one or more alkyl, aryl, alkaryl, alkoxy, aryloxy, cycloalkyl, halide, and/or other groups which do not interfere with the alkylation reaction.

Suitable aromatic hydrocarbons include benzene, naphthalene, anthracene, naphthacene, perylene, coronene, and phenanthrene.

Generally the alkyl groups which can be present as substituents on the aromatic compound contain from 1 to about 22 carbon atoms and usually from about 1 to 8 carbon atoms, and most usually from about 1 to 4 carbon atoms.

Suitable alkyl substituted aromatic compounds include toluene, xylene, isopropylbenzene, normal propylbenzene, alpha-methylnaphthalene, ethylbenzene, cumene, mesitylene, durene, p-cymene, butylbenzene, pseudocumene, o-diethylbenzene, m-diethylbenzene, p-diethylbenzene, isoamylbenzene, isohexylbenzene, pentaethylbenzene, pentamethylbenzene; 1,2,3,4-tetraethylbenzene; 1,2,3,5-tetramethylbenzene; 1,2,4-triethylbenzene; 1,2,3-trimethylbenzene, m-butyltoluene; p-butyltoluene; 3,5-diethyltoluene; o-ethyltoluene; p-ethyltoluene; m-propyltoluene; 4-ethyl-m-xylene; dimethylnaphthalenes; ethylnaphthalene; 2,3-dimethylanthracene; 9-ethylanthracene; 2-methylanthracene; o-methylanthracene; 9,10-dimethylphenanthrene; and 3-methyl-phenanthrene. Higher molecular weight alkylaromatic hydrocarbons can also be used as starting materials and include aromatic hydrocarbons such as are produced by the alkylation of aromatic hydrocarbons with olefin oligomers. Such product are frequently referred to in the art as alkylate and include hexylbenzene, nonylbenzene, dodecylbenzene, pentadecylbenzene, hexyltoluene, nonyltoluene, dodecyltoluene, pentadecytoluene, etc. Very often alkylate is obtained as a high boiling fraction in which the alkyl group attached to the aromatic nucleus varies in size from about $C_6$ to about $C_{12}$. When cumene or ethylbenzene is the desired product, the present process produces acceptably little by-products such as xylenes. The xylenes make in such instances may be less than about 500 ppm.

Reformate containing substantial quantities of benzene, toluene and/or xylene constitutes a particularly useful feed for the alkylation process of this invention.

The alkylating agents which are useful in the process of this invention generally include any aliphatic or aromatic organic compound having one or more available alkylating aliphatic groups capable of reaction with the alkylatable aromatic compound, the alkylating group possessing from 1 to 5 carbon atoms. Examples of suitable alkylating agents are olefins such as ethylene, propylene, the butenes, and the pentenes; alcohols (inclusive of monoalcohols, dialcohols, trialcohols, etc.) such as methanol, ethanol, the propanols, the butanols, and the pentanols; aldehydes such as formaldehyde, acetaldehyde, propionaldehyde, butyraldehyde, and n-valeraldehyde; and alkyl halides such as methyl chloride, ethyl chloride, the propyl chlorides, the butyl chlorides, and the pentyl chlorides, and so forth.

Mixtures of light olefins are especially useful as alkylating agents in the alkylation process of this invention. Accordingly, mixtures of ethylene, propylene, butenes, and/or pentenes which are major constituents of a variety of refinery streams, e.g., fuel gas, gas plant off-gas containing ethylene, propylene, etc., naphtha cracker off-gas containing light olefins, refenery FCC propane/propylene streams, etc., are useful alkylating agents herein. For example, a typical FCC light olefin stream possesses the following composition:

|  | Wt. % | Mole % |
| --- | --- | --- |
| Ethane | 3.3 | 5.1 |
| Ethylene | 0.7 | 1.2 |
| Propane | 14.5 | 15.3 |
| Propylene | 42.5 | 46.8 |
| Isobutane | 12.9 | 10.3 |
| n-Butane | 3.3 | 2.6 |
| Butenes | 22.1 | 18.32 |
| Pentanes | 0.7 | 0.4 |

Reaction products which may be obtained from the process of the invention include ethylbenzene from the reaction of benzene with ethylene, cumene from the reaction of benzene with propylene, ethyltoluene from the reaction of toluene with ethylene, cymenes from the reaction of toluene with propylene, and sec-butylbenzene from the reaction of benzene and n-butenes.

MCM-56 is a unique layered material having a composition involving the molar relationship:

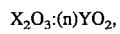

$$X_2O_3:(n)YO_2,$$

wherein X is a trivalent element, such as aluminum, boron, iron and/or gallium, preferably aluminum; Y is a tetravalent element such as silicon and/or germanium, preferably silicon; and n is less than about 35, e.g., from about 5 to less than about 25, usually from about 10 to less than about 20, more usually from about 13 to about 18. In the as-synthesized form, the material has a formula, on an anhydrous basis and in terms of moles of oxides per n moles of $YO_2$, as follows:

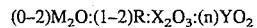

$$(0-2)M_2O:(1-2)R:X_2O_3:(n)YO_2$$

wherein M is an alkali or alkaline earth metal, and R is an organic moiety. The M and R components are associated with the material as a result of their presence during synthesis, and are easily removed by post-synthesis methods hereinafter more particularly described.

The MCM-56 material may be thermally treated and in the calcined form exhibits high surface area (greater than 300 m²/gm) and unusually large sorption capacity for certain large molecules when compared to previously described materials such as calcined PSH-3, SSZ-25, MCM-22, and MCM-49. The MCM-56 wet cake, i.e., as-synthesized MCM-56, is swellable indicating the absence of interlayer bridges, in contrast with MCM-49 which is unswellable.

To the extent desired, the original alkali or alkaline earth, e.g., sodium, cations of the as-synthesized material can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which tailor the catalytic activity for certain hydrocarbon conversion reactions. These include hydrogen, rare earth metals and metals of Groups IIA, IIIA, IVA, IB, IIB, IIIB, IVB and VIII of the Periodic Table of the Elements.

The MCM-56 material appears to be essentially pure with little or no detectable impurity crystal or layer phases and has an X-ray diffraction pattern which is distinguished by the combination of line positions and intensities from the patterns of other known as-synthesized or thermally treated materials as shown below in Table I (as synthesized) and Table II (calcined). In these tables, intensities are defined relative to the d-spacing line at 12.4 Angstroms.

TABLE I

| MCM-56 | | Closest Relative Layered Material | | Closest Relative 3-Dimensional Material MCM-49 | |
|---|---|---|---|---|---|
| Interplanar d-Spacing (A) | Relative Intensity | Interplanar d-Spacing (A) | Relative Intensity | Interplanar d-spacing (A) | Relative Intensity |
| — | — | 13.5 | m | — | — |
| 12.4 ± 0.2 | vs | 12.4 | m–vs | 12.5 | vs |
| — | — | 11.1 | m | 11.2 | m–s |
| 9.9 ± 0.3 | m | — | — | — | — |
| — | — | 9.2 | m | 9.0 | m |
| 6.9 ± 0.1 | w | 6.9 | w | 6.9 | w |
| 6.4 ± 0.3 | w | 6.7 | w | 6.4 | w |
| 6.2 ± 0.1 | w | 6.2 | w | 6.2 | m |
| 3.57 ± 0.07 | m–s | 3.56 | w–m | 3.55 | w–m |
| 3.44 ± 0.07 | vs | 3.43 | s–vs | 3.44 | vs |

TABLE II

| MCM-56 | | MCM-22 | | MCM-49 | |
|---|---|---|---|---|---|
| Interplanar d-Spacing (A) | Relative Intensity | Interplanar d-Spacing (A) | Relative Intensity | Interplanar d-spacing (A) | Relative Intensity |
| 12.4 ± 0.2 | vs | 12.4 | m–vs | 12.4 | vs |
| — | — | 11.0 | m–s | 11.1 | s |
| 9.9 ± 0.3 | m–s | — | — | — | — |
| — | — | 8.8 | m–vs | 8.9 | m–s |
| 6.9 ± 0.1 | w | 6.9 | w–m | 6.9 | w |
| 6.2 ± 0.1 | s | 6.2 | m–vs | 6.2 | m |
| 3.55 ± 0.07 | m–s | 3.56 | w–m | 3.57 | w |
| 3.42 ± 0.07 | vs | 3.42 | vs | 3.43 | s–vs |

The materials used for generation of the data in Table I were wet cake layered MCM-56, wet cake layered material synthesized with the same organic directing agent which, when calcined, transforms into MCM-22, and wet cake crystalline MCM-49. The materials used for the data in Table II were the calcined materials used for Table I. Calcination of each material was in air at 540° C. for 2–20 hours. The most effective diagnostic feature allowing the initial differentiation between MCM-56 and the other members of this family (MCM-22 and MCM-49-type materials) is observed in the region of 8.8–11.2 Angstrom d-spacing. The latter species exhibit two resolved maxima at approximately 8.8–9.2 Angstroms and 10.8–11.2 Angstrom with a distinct depression between them. MCM-56 is characterized by a broad band centered around d-spacing 9.9 Angstroms. While the band may have asymmetric profile, for example with an inflection point, the emergence of a depression may be indicative of the onset of MCM-49 formation and the loss of MCM-56.

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s =strong (40–60), m=medium (20–40) and w=weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history. Other changes in diffraction patterns can be indicative of important differences between materials, which is the case for comparing MCM-56 with similar materials, e.g., MCM-49, MCM-22, and PSH-3.

The significance of differences in the X-ray diffraction patterns of these materials can be explained from a knowledge of the structures of the materials. MCM-22 and PSH-3 are members of an unusual family of materials because, upon calcination, there are changes in the X-ray diffraction pattern that can be explained by a significant change in one axial dimension. This is indicative of a profound change in the bonding within the materials and not a simple loss of the organic material. The precursor members of this family can be clearly distinguished by X-ray diffraction from the calcined members (e.g., compare middle columns of Tables I and II). An examination of the X-ray diffraction patterns of both precursor and calcined forms shows a number of reflections with very similar position and intensity, while other peaks are different. Some of these differences are directly related to the changes in the axial dimension and bonding.

Crystalline MCM-49 has an axial dimension similar to those of the calcined members of the family and, hence, there are similarities in their X-ray diffraction patterns. Nevertheless, the MCM-49 axial dimension is different from that observed in the calcined materials. For example, the changes in axial dimensions in MCM-22 can be determined from the positions of peaks particularly sensitive to these changes. Two such peaks occur at ~13.5 Angstroms and ~6.75 Angstroms in precursor MCM-22, at ~12.8 Angstroms and ~6.4 Angstroms in as-synthesized MCM-49, and at ~12.6 Angstroms and ~6.30 Angstroms in the calcined MCM-22. The ~12.8 Angstroms peak in MCM-49 is very close to the intense ~12.4 Angstroms peak observed for all three materials, and is frequently not fully separated from it.

Likewise, the ~12.6 Angstroms peak of the calcined MCM-22 material is usually only visible as a shoulder on the intense ~12.4 Angstroms peak.

Other features which collectively distinguish MCM-56 from the similar materials described above are summarized in Table III below.

TABLE III

| Feature | MCM-22 | MCM-49 | MCM-56 |
|---|---|---|---|
| As-synthesized: | | | |
| Structure | layered | 3-dimensional | layered |
| Swellable | yes | no | yes |
| Condenses upon Calcination | yes | yes | no |
| Calcined: | | | |
| Sorption capacity for 1,3,5-trimethyl benzene[1] | low | low | high |
| Initial uptake of 2,2-dimethylbutane[2] | slow | slow | fast |

[1]Low sorption capacity is defined as less than about 8 to 10 μl/g. High capacity is at least about 4 times the low capacity. Calcined MCM-56 sorbs at least about 35 μl/g.
[2]Initial uptake is defined as time to adsorb the first 15 mg of 2,2-dimethylbutane/gram of sorbent. Fast uptake is less than 20 seconds; slow uptake is at least 5 times the fast value.
One gram of calcined MCM-56 sorbs 15 mg of 2,2-dimethylbutanes in less than about 20 seconds, e.g., less than about 15 seconds.

When used as a catalyst, the layered MCM-56 material may be subjected to treatment to remove part or all of any organic constituent. The crystalline material can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating the silicate with a solution containing a platinum metal- containing ion. Thus, suitable platinum compounds for this purpose include chloroplatinic acid, platinous chloride and various compounds containing the platinum amine complex.

MCM-56 may be thermally treated without affecting its layered structure in that it is still swellable after thermal treatment. Thermal treatment is generally performed by heating at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions. Non-limiting examples of such reactions include those described in U.S. Pat. Nos. 4,954,325; 4,973,784; 4,992,611; 4,956,514; 4,962,250; 4,982,033; 4,962,257; 4,962,256; 4,992,606; 4,954,663; 4,992,615; 4,983,276; 4,982,040; 4,962,239; 4,968,402; 5,000,839; 5,001,296; 4,986,894; 5,001,295; 5,001,283; 5,012,033; 5,019,670; 5,019,665; 5,019,664; and 5,013,422, each incorporated herein by reference as to the description of said catalytic reactions.

The layered MCM-56 material, when employed either as an adsorbent or as a catalyst in an organic compound conversion process, should be dehydrated, at least partially. This can be done by heating to a temperature in the range of 200° C. to about 370° C. in an atmosphere such as air, nitrogen, etc. and at atmospheric, subatmospheric or superatmospheric pressures for between 30 minutes and 48 hours. Dehydration can also be performed at room temperature merely by placing the MCM-56 in a vacuum, but a longer time is required to obtain a sufficient amount of dehydration.

The present layered MCM-56 material can be prepared from a reaction mixture containing sources of alkali or alkaline earth metal (M), e.g., sodium or potassium, cation, an oxide of trivalent element X, e.g., aluminum, an oxide of tetravalent element Y, e.g., silicon, directing agent (R), and water, said reaction mixture having a composition, in terms of mole ratios of oxides, within the following ranges:

| Reactants | Useful | Preferred |
|---|---|---|
| $YO_2/X_2O_3$ | 5 to 35 | 10 to 25 |
| $H_2O/YO_2$ | 10 to 70 | 16 to 40 |
| $OH^-/YO_2$ | 0.05 to 0.5 | 0.06 to 0.3 |
| $M/YO_2$ | 0.05 to 3.0 | 0.06 to 1.0 |
| $R/YO_2$ | 0.1 to 1.0 | 0.3 to 0.5 |

In the present synthesis method, the source of $YO_2$ must be comprised predominately of solid $YO_2$, for example at least about 30 wt. % solid $YO_2$ in order to obtain the MCM-56 crystal product. Where $YO_2$ is silica, the use of a silica source containing at least about 30 wt. % solid silica, e.g., Ultrasil (a precipitated, spray dried silica containing about 90 wt. % silica) or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) favors crystalline MCM-56 formation from the above mixture under the synthesis conditions required. Preferably, therefore, the $YO_2$, e.g., silica, source contains at least about 30 wt. % solid $YO_2$, e.g., silica, and more preferably at least about 40 wt. % solid $YO_2$, e.g., silica.

Directing agent R is selected from the group consisting of cycloalkylamine, azacycloalkane, diazacycloalkane, and mixtures thereof, alkyl comprising from 5 to 8 carbon atoms. Non-limiting examples of R include cyclopentylamine, cyclohexylamine, cycloheptylamine, hexamethyleneimine, heptamethyleneimine, homopiperazine, and combinations thereof.

Crystallization of the present layered material can be carried out at either static or stirred conditions in a suitable reactor vessel, such as for example, polypropylene jars or teflon lined or stainless steel autoclaves. The total useful range of temperatures for crystallization is from about 80° C. to about 225° C. It is critical, however, for synthesis of MCM-56 from the above reaction mixture to stop and quench the reaction prior to the onset of MCM-49 formation at the expense of MCM-56. Thereafter, the MCM-56 is separated from the liquid and recovered.

It should be realized that the reaction mixture components can be supplied by more than one source. The reaction mixture can be prepared either batchwise or continuously.

MCM-56 can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, MCM-56 can be extruded before drying or partially dried and then extruded.

Prior to its use in a catalytic process, the zeolite MCM-56 crystals may be dehydrated, at least partially. This can be done by heating the crystals to a temperature in the range of from about 200° C. to about 595° C. in an atmosphere such as air, nitrogen, etc., and at atmospheric, subatmospheric or superatmospheric pressures for between about 30 minutes to about 48 hours. Dehydration can also be performed at room temperature merely by placing the crystalline material in a vacuum, but a longer time is required to obtain a sufficient amount of dehydration.

It may be desired to incorporate the MCM-56 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

The present catalyst may comprise MCM-56 and a matrix material such as alumina, silica, titania or a mixture thereof.

In addition to the foregoing materials, MCM-56 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia, and silica-magnesia-zirconia.

The present catalyst may be in the form of extrudate, beads or fluidizable microspheres.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

Particularly when MCM-56 is bound by an extrusion process with an alumina binder, the as-synthesized form of MCM-56 may be co-extruded with alumina to form a green strength extrudate. This green strength extrudate may then be subjected to an ion exchange treatment with ammonium ions prior to the initial calcination of the extrudate. Such a binding procedure, wherein ammonium exchange of a green strength extrudate precedes the initial calcination of the extrudate, is described in copending U.S. application Ser. No. 08/042,907, filed Apr. 5, 1993, now U.S. Pat. No. 5,354,718. This procedure differs from the normal procedure for preparing an alumina/zeolite extrudate, insofar as the normal procedure involves calcination of the green strength extrudate prior to the initial ammonium exchange of the extrudate.

The alkylation process of this invention is conducted such that the organic reactants, i.e., the alkylatable aromatic compound and the alkylating agent, are brought into contact with the zeolite MCM-56 catalyst composition in a suitable reaction zone such as, for example, in a flow reactor containing a fixed bed of the catalyst composition, under effective alkylation conditions. Such conditions include a temperature of from about 0° C. to about 500° C., and preferably between about 50° C. and about 250° C. The reaction generally takes place at pressures of from about 0.2 to about 250 atmospheres and preferably from about 5 to about 100 atmospheres. The molar ratio of alkylatable aromatic compound to alkylating agent can be from about 0.1:1 to about 50:1 and preferably can be from about 0.5:1 to about 10:1. Reaction is suitably accomplished utilizing a feed weight hourly space velocity (WHSV of between about 0.1 $hr^{-1}$ and about 500 $hr^{-1}$ and preferably from 0.5 $hr^{-1}$ to about 100 $hr^{-1}$. The latter WHSV is based upon the total weight of active catalyst (and binder if present).

The reactants can be in either the vapor phase or the liquid phase and can be neat, i.e., free from intentional admixture or dilution with other material, or they can be brought into contact with the zeolite catalyst composition with the aid of carrier gases or diluents such as, for example, hydrogen or nitrogen.

The alkylation process described herein can be carried out as a batch-type, semi-continuous or continuous operation utilizing a fixed or moving bed catalyst system. A particular embodiment entails use of a catalyst zone wherein the hydrocarbon charge is passed concurrently or countercurrently through a moving bed of particle-form catalyst. The latter, after use, is conducted to a regeneration zone where coke is burned from the catalyst in an oxygen-containing atmosphere (such as air) at elevated temperature, after which the regenerated catalyst is recycled to the conversion zone for further contact with the organic reactants.

When benzene is alkylated with ethylene to produce ethylbenzene, the alkylation reaction may be carried out in the liquid phase. Suitable liquid phase conditions can be selected by reference to the phase diagram for benzene. In the liquid phase, the reaction is carried out with the benzene feedstock in the liquid phase with the reaction conditions (temperature, pressure) appropriate to this end.

Liquid phase operation may be carried out at temperatures between 300° and 500° F. (about 150° to 260° C.), usually in the range of 400° to 500° F. (about 205° to 260° C.).

Pressures during the liquid phase alkylation step may be as high as about 3000 psig, (about 20875 kPa abs.) and generally will not exceed 1000 psig (about 7000 kPa). The reaction may be carried out in the absence of hydrogen and accordingly the prevailing pressures are those of the reactant species. In a high pressure liquid phase operation, the temperature may be from about 300° to 600° F. with the pressure in the range of about 400 to 800 psig. The space velocity may be from about 0.1 to 20 WHSV, based on the ethylene feed. Preferred space velocities for the liquid phase reaction include ranges, for example, from about 0.5 to about 3 WHSV, e.g., from about 0.75 to 2.0 WHSV, (ethylene). The ratio of the benzene to the ethylene in the alkylation reactor may be from 1:1 to 30:1 molar, normally about 5:1 to 20:1 molar, and in most cases from about 5:1 to 10:1 molar.

When benzene is alkylated with propylene to produce cumene, the reaction may also take place under liquid phase conditions including a temperature of up to about 250° C., e.g., up to about 150° C., e.g., from about 10° C. to about 125° C.; a pressure of about 250 atmospheres or less, e.g., from about 1 to about 30 atmospheres; and an aromatic hydrocarbon weight hourly space velocity (WHSV) of from about 5 $hr^{-1}$ to about 250 $hr^{-1}$, from 5 $hr^{-1}$ to about 50 $hr^{-1}$. An example of a combination of reaction conditions includes a temperature of from about 10° C. to 150° C., a pressure of from about 1 to about 30 atmospheres, and a WHSV of from about 5 to about 50 $hr^{-1}$. Another example of a combination of reaction conditions includes a temperature of from about 10° C. to 250° C., a pressure of from about 1 to about 250 atmospheres, and a WHSV of from about 5 to about 250 $hr^{-1}$.

When conducting alkylation, various types of reactors can be used. For example, the process can be carried out in batchwise fashion by adding the catalyst and aromatic feedstock to a stirred autoclave, heating to reaction temperature, and then slowly adding the olefinic feedstock. A heat transfer fluid can be circulated through the jacket of the autoclave, or a condenser can be provided, to remove the heat of reaction and maintain a constant temperature. Large scale industrial processes may employ a fixed-bed reactor operating in an upflow or downflow mode or a moving-bed reactor operating with concurrent or countercurrent catalyst and hydrocarbon flows. These reactors may contain a single catalyst bed or multiple beds and may be equipped for the interstage addition of olefins and interstage cooling. Interstage olefin addition and more nearly isothermal operation enhance product quality and catalyst life. A moving-bed reactor makes possible the continuous removal of spent catalyst for regeneration and replacement by fresh or regenerated catalysts.

In a particular embodiment of the present invention, the alkylation process is carried out with addition of olefin in at least two stages. Preferably, there will be two or more catalyst beds or reactors in series, wherein at least a portion of the olefin is added between the catalyst beds or reactors. Interstage cooling can be accomplished by the use of a cooling coil or heat exchanger. Alternatively, interstage cooling can be effected by staged addition of the aromatic feedstock in at least two stages. In this instance, at least a portion of the aromatic feedstock is added between the catalyst beds or reactors, in similar fashion to the staged addition of olefin described above. The staged addition of aromatic feedstock provides additional cooling to compensate for the heat of reaction.

In a fixed-bed reactor or moving-bed reactor, alkylation is completed in a relatively short reaction zone following the introduction of olefin. Ten to thirty percent of the reacting aromatic molecules may be alkylated more than once. Transalkylation is a slower reaction which occurs both in the alkylation zone and in the remainder of the catalyst bed. If transalkylation proceeds to equilibrium, better than 90 wt. % selectivity to monoalkylated product is generally achieved. Thus, transalkylation increases the yield of monoalkylated product by reacting the polyalkylated products with additional benzene.

The alkylation reactor effluent contains the excess aromatic feed, monoalkylated product, polyalkylated products, and various impurities. The aromatic feed is recovered by distillation and recycled to the alkylation reactor. Usually a small bleed is taken from the recycle stream to eliminate unreactive impurities from the loop. The bottoms from the benzene distillation are further distilled to separate monoalkylated product from polyalkylated products and other heavies. In most cases, the recovered monoalkylated product must be very pure. In the production of cumene, for example, impurities, such as n-propylbenzene, butylbenzenes, ethylbenzene and alpha-methylstyrene, all should be reduced to low (e.g., <100–300 ppm) levels since they are converted during the oxidation process to make phenol from cumene. Only small amounts of n-propylbenzene can be removed by distillation, and so the catalyst should make very low levels of this impurity. It is important to have a feedstock which is relatively free of ethylene and butylenes to avoid ethylbenzene and butylbenzenes in the cumene product; these contaminants can be removed by distillation, but to do so greatly increases the amount of required downstream fractionation.

Additional monoalkylated product may be produced by transalkylation. The polyalkylated products may be recycled to the alkylation reactor to undergo transalkylation or they may be reacted with additional aromatic feed in a separate reactor. It may be preferred to blend the bottoms from the distillation of monoalkylated product with a stoichiometric excess of the aromatic feed, and react the mixture in a separate reactor over a suitable transalkylation catalyst. The transalkylation catalyst may be a catalyst comprising a zeolite such as MCM-49, MCM-22, PSH-3, SSZ-25, zeolite X, zeolite Y, zeolite beta, or mordenite. Such transalkylation reactions over zeolite beta are disclosed in the aforementioned U.S. Pat. No. 4,891,458; and further such transalkylations using an acid dealuminized mordenite are disclosed in U.S. Pat. No. 5,243,116. Another particular form of mordenite, which may be used as a transalkylation catalyst, is TEA mordenite, i.e., synthetic mordenite prepared from a reaction mixture comprising a tetraethylammonium directing agent. TEA mordenite is disclosed in U.S. Pat. Nos. 3,766,093 and 3,894,104. The effluent from the transalkylation reactor is blended with alkylation reactor effluent and the combined stream distilled. A bleed may be taken from the polyalkyated product stream to remove unreactive heavies from the loop or the polyalkyated product stream may be distilled to remove heavies prior to transalkylation.

In order to more fully illustrate the nature of the invention and the manner of practicing same, the following examples are presented.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 $sec^{-1}$). The Alpha Test is described in U.S. Pat. No. 3,354,078; in the *Journal of Catalysis*, 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis*, 61, 395.

EXAMPLE 1

A mixture of 258 gram of water, 6 grams of 50% sodium hydroxide solution, 13.4 grams of sodium aluminate solution (25.5% $Al_2O_3$ and 19.5% $Na_2O$), 51.4 grams of Ultrasil (VN3), and 27.1 grams of hexamethyleneimine (HMI) was reacted in a 600 ml stirred (400 rpm) autoclave at 143° C.

The reaction mixture had the following composition in mole ratios:

$SiO_2/Al_2O_3$=23

$OH^-/SiO_2$=0.21

$Na/SiO_2$=0.21

$HMI/SiO_2$=0.35

$H_2O/SiO_2$=20

The reaction was stopped at 34 hours. The product was filtered, washed with water to form a wet cake, and a portion was dried in an oven at 110° C.

A portion of the product wet cake and the dried portion were submitted for X-ray analysis and identified as MCM-56. The X-ray diffraction pattern of the dried MCM-56 is presented below in Table IV and shown in FIG. 1.

TABLE IV

| 2 theta | d(A) | I/I$_o$ | Comments[a] |
|---|---|---|---|
| 4.1 | 21.6 | 10 | B |
| 6.94 | 12.74 | 34 | B, sh |
| 7.15 | 12.36 | 100 | S |
| 8.9 | 9.9 | 32 | VVB |
| 12.84 | 6.89 | 12 | B |
| 13.89 | 6.38 | 7 | VB, sh |
| 14.32 | 6.18 | 15 | S |
| 15.92 | 5.57 | 8 | VVB |
| 19.94 | 4.45 | 30 | VVB |
| 21.98 | 4.04 | 43 | B |
| 22.51 | 3.95 | 59 | VB |
| 23.44 | 3.80 | 28 | VVB |
| 24.97 | 3.57 | 43 | S |
| 25.93 | 3.44 | 100 | S |
| 26.61 | 3.35 | 51 | B |
| 31.52 | 2.838 | 5 | S |
| 33.40 | 2.683 | 10 | VVB |
| 34.71 | 2.584 | 3 | VVB |
| 36.26 | 2.477 | 3 | S |
| 37.00 | 2.429 | 3 | S |
| 37.75 | 2.383 | 9 | S |

[a]S = sharp, B = broad, VB = very broad, VVB = very very broad, sh = shoulder

The chemical composition of the product of Example 1 was, in wt. %,

N=1.61

Na=1.1

$Al_2O_3$=6.6

$SiO_2$=70.5

Ash=78.2

The $SiO_2/Al_2O_3$ molar ratio of this product was 18.

EXAMPLE 2

Figure 2:
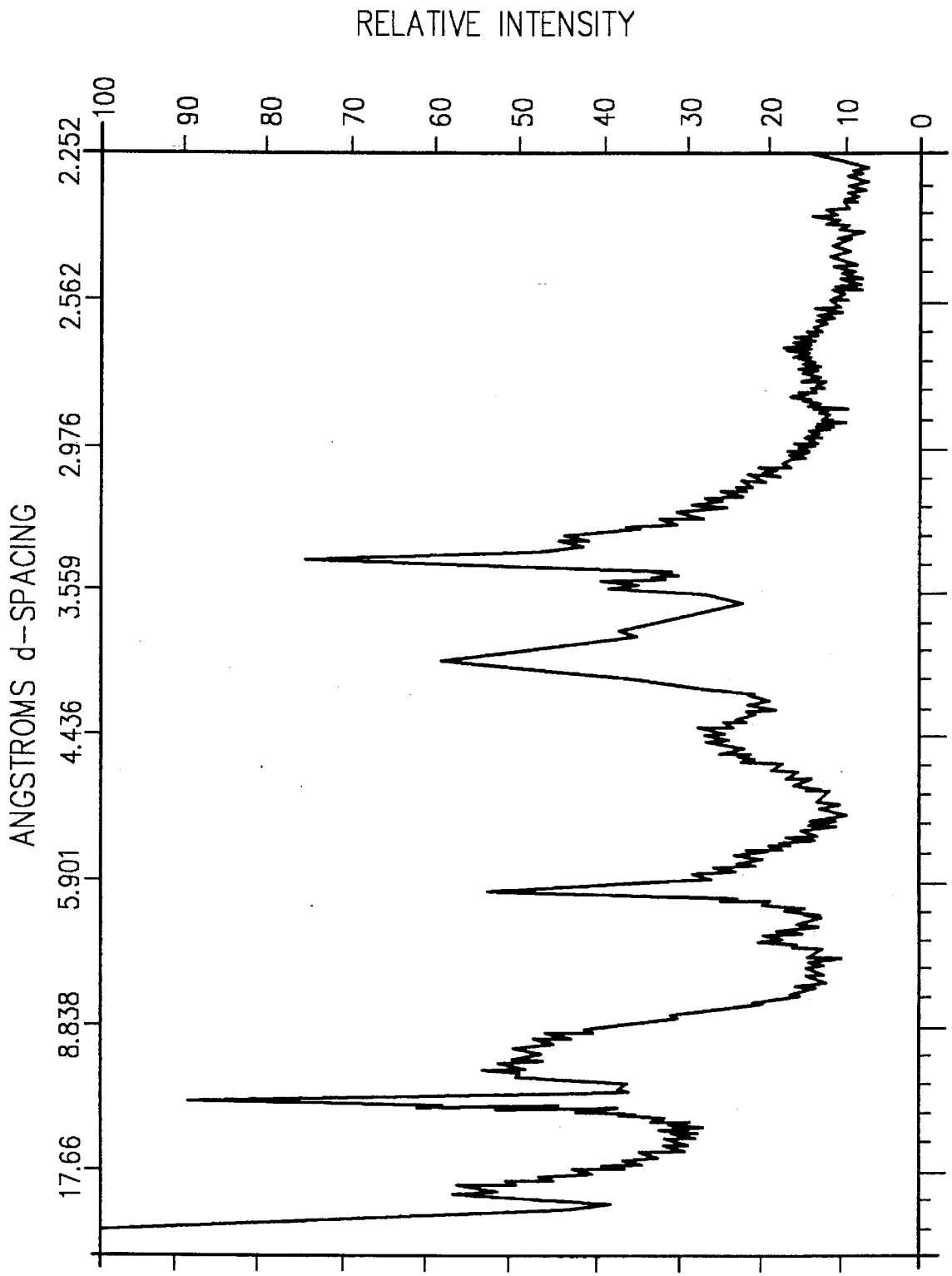
FIG. 2 shows the X-ray diffraction pattern of the calcined product MCM-56 of Example 2.

A portion of the product of Example 1 was ammonium exchanged by contacting three times with 1M ammonium nitrate, and then calcined in air for 6 hours at 540° C. The X-ray diffraction pattern of the calcined product of this example proved it to be MCM-56 and is presented below in Table V and shown in FIG. 2.

TABLE V

| 2 theta | d(A) | I/I$_o$ | Comments[a] |
|---|---|---|---|
| 4.1 | 21.6 | 37 | B |
| 7.14 | 12.38 | 97 | S |
| 8.9 | 9.9 | 33 | VVB |
| 12.80 | 6.92 | 12 | B |
| 14.42 | 6.14 | 59 | S |
| 15.80 | 5.61 | 14 | VVB |
| 19.76 | 4.49 | 27 | VVB |
| 22.45 | 3.96 | 73 | VVB |
| 23.75 | 3.75 | 26 | VVB |
| 25.10 | 3.55 | 37 | S |
| 26.05 | 3.42 | 100 | S |
| 26.79 | 3.33 | 35 | B |
| 31.75 | 2.818 | 6 | S |
| 33.52 | 2.673 | 10 | VVB |
| 34.82 | 2.576 | 4 | VVB |
| 36.44 | 2.466 | 3 | S |
| 37.96 | 2.370 | 6 | S |

[a]S = sharp, B = broad, VVB = very very broad

EXAMPLE 3

For comparison purposes, Example 1 of U.S. Pat. No. 4,954,325, incorporated herein by reference, was repeated. The as-synthesized crystalline material of the example, referred to herein as MCM-22 precursor or the precursor form of MCM-22, was examined by X-ray diffraction analysis. Its X-ray diffraction pattern is presented in Table VI and shown in FIG. 5(b).

TABLE VI

| 2-theta | d(A) | I/I$_o$ |
|---|---|---|
| 3.1 | 28.5 | 14 |
| 3.9 | 22.7 | <1 |
| 6.53 | 13.53 | 36 |
| 7.14 | 12.38 | 100 |
| 7.94 | 11.13 | 34 |
| 9.67 | 9.15 | 20 |
| 12.85 | 6.89 | 6 |
| 13.26 | 6.68 | 4 |
| 14.36 | 6.17 | 2 |
| 14.70 | 6.03 | 5 |
| 15.85 | 5.59 | 4 |
| 19.00 | 4.67 | 2 |
| 19.85 | 4.47 | 22 |
| 21.56 | 4.12 | 10 |
| 21.94 | 4.05 | 19 |
| 22.53 | 3.95 | 21 |
| 23.59 | 3.77 | 13 |
| 24.98 | 3.56 | 20 |
| 25.98 | 3.43 | 55 |
| 26.56 | 3.36 | 23 |
| 29.15 | 3.06 | 4 |
| 31.58 | 2.833 | 3 |
| 32.34 | 2.768 | 2 |
| 33.48 | 2.676 | 5 |
| 34.87 | 2.573 | 1 |
| 36.34 | 2.472 | 2 |
| 37.18 | 2.418 | 1 |
| 37.82 | 2.379 | 5 |

EXAMPLE 4

The product of Example 3 was calcined at 538° C. for 20 hours. The X-ray diffraction pattern of this calcined product is shown in Table VII below and in FIG. 5(c).

TABLE VII

| 2 theta | d(A) | I/I$_o$ |
|---|---|---|
| 2.80 | 31.55 | 25 |
| 4.02 | 21.98 | 10 |
| 7.10 | 12.45 | 96 |
| 7.95 | 11.12 | 47 |

TABLE VII-continued

| 2 theta | d(A) | I/I₀ |
|---|---|---|
| 10.00 | 8.85 | 51 |
| 12.90 | 6.86 | 11 |
| 14.34 | 6.18 | 42 |
| 14.72 | 6.02 | 15 |
| 15.90 | 5.57 | 20 |
| 17.81 | 4.98 | 5 |
| 19.08 | 4.65 | 2 |
| 20.20 | 4.40 | 20 |
| 20.91 | 4.25 | 5 |
| 21.59 | 4.12 | 20 |
| 21.92 | 4.06 | 13 |
| 22.67 | 3.92 | 30 |
| 23.70 | 3.75 | 13 |
| 25.01 | 3.56 | 20 |
| 26.00 | 3.43 | 100 |
| 26.96 | 3.31 | 14 |
| 27.75 | 3.21 | 15 |
| 28.52 | 3.13 | 10 |
| 29.01 | 3.08 | 5 |
| 29.71 | 3.01 | 5 |
| 31.61 | 2.830 | 5 |
| 32.21 | 2.779 | 5 |
| 33.35 | 2.687 | 5 |
| 34.61 | 2.592 | 5 |

EXAMPLE 5

A 2.24 part quantity of 45% sodium aluminate was added to a solution containing 1.0 part of 50% NaOH solution and 43.0 parts H₂O in an autoclave. An 8.57 part quantity of Ultrasil precipitated silica was added with agitation, followed by 4.51 parts of HMI.

The reaction mixture had the following composition, in mole ratios:

$SiO_2/Al_2O_3$=23
$OH^-/SiO_2$=0.21
$Na/SiO_2$=0.21
$HMI/SiO_2$=0.35
$H_2O/SiO_2$=19.3

The mixture was crystallized at 150° C. for 84 hours with stirring. The product was identified as MCM-49 and had the X-ray pattern which appears in Table VIII and FIG. 5(d).

The chemical composition of the product was, in wt. %,

| N | 1.70 |
|---|---|
| Na | 0.70 |
| Al₂O₃ | 7.3 |
| SiO₂ | 74.5 |
| Ash | 84.2 |

The silica/alumina mole ratio of the product was 17.3.

The sorption capacities, after calcining at 538° C. for 9 hours were, in wt. %,

| Cyclohexane, 40 Torr | 10.0 |
|---|---|
| n-Hexane, 40 Torr | 13.1 |
| H₂O, 12 Torr | 15.4 |

A portion of the sample was calcined in air for 3 hours at 538° C. This material exhibited the X-ray diffraction pattern shown in Table IX.

TABLE VIII

| 2 theta | d(A) | I/I₀ |
|---|---|---|
| 3.1 | 28.5 | 18 |
| 3.9 | 22.8 | 7+ |
| 6.81 | 12.99 | 61 sh |
| 7.04 | 12.55 | 97 |
| 7.89 | 11.21 | 41 |
| 9.80 | 9.03 | 40 |
| 12.76 | 6.94 | 17 |
| 13.42 | 6.60 | 4* |
| 13.92 | 6.36 | 17 |
| 14.22 | 6.23 | 11 |
| 14.63 | 6.05 | 2 |
| 15.81 | 5.61 | 15 |
| 17.71 | 5.01 | 4 |
| 18.86 | 4.71 | 4 |
| 19.23 | 4.62 | 6 |
| 20.09 | 4.42 | 27 |
| 20.93 | 4.24 | 8 |
| 21.44 | 4.14 | 17 |
| 21.74 | 4.09 | 37 |
| 22.16 | 4.01 | 17 |
| 22.56 | 3.94 | 58 |
| 23.53 | 3.78 | 26 |
| 24.83 | 3.59 | 22 |
| 25.08 | 3.55 | 10 |
| 25.86 | 3.45 | 100 |
| 26.80 | 3.33 | 28 |
| 27.53 | 3.24 | 21 |
| 28.33 | 3.15 | 15 |
| 28.98 | 3.08 | 4 |
| 29.47 | 3.03 | 2 |
| 31.46 | 2.843 | 4 |
| 32.08 | 2.790 | 6 |
| 33.19 | 2.699 | 9 |
| 34.05 | 2.633 | 5 |
| 34.77 | 2.580 | 4 |
| 36.21 | 2.481 | 2 |
| 36.90 | 2.436 | 3 |
| 37.68 | 2.387 | 8 | sh = Shoulder
+ = Non-crystallographic MCM-49 peak
* = Impurity peak

TABLE IX

| 2-Theta | d(A) | I/I₀ |
|---|---|---|
| 3.2 | 28.0 | 9+ |
| 3.9 | 22.8 | 7+ |
| 6.90 | 12.81 | 48 sh |
| 7.13 | 12.39 | 100 |
| 7.98 | 11.08 | 46 |
| 9.95 | 8.89 | 53 |
| 12.87 | 6.88 | 10 |
| 14.32 | 6.18 | 36 |
| 14.74 | 6.01 | 11 |
| 15.94 | 5.56 | 17 |
| 17.87 | 4.96 | 2 |
| 19.00 | 4.67 | 5 |
| 19.35 | 4.59 | 3 |
| 20.24 | 4.39 | 14 |
| 21.06 | 4.22 | 5 |
| 21.56 | 4.12 | 15 |
| 21.87 | 4.06 | 25 |
| 22.32 | 3.98 | 12 |
| 22.69 | 3.92 | 41 |
| 23.69 | 3.76 | 23 |
| 24.95 | 3.57 | 19 |
| 25.22 | 3.53 | 4 |
| 25.99 | 3.43 | 90 |
| 26.94 | 3.31 | 20 |
| 27.73 | 3.22 | 17 |
| 28.55 | 3.13 | 11 |
| 29.11 | 3.07 | 3 |

TABLE IX-continued

| 2-Theta | d(A) | I/I$_o$ |
|---|---|---|
| 29.63 | 3.01 | 2 |
| 31.59 | 2.833 | 6 |
| 32.23 | 2.777 | 4 |
| 33.34 | 2.687 | 9 |
| 34.35 | 2.611 | 4 |
| 34.92 | 2.570 | 3 |
| 36.35 | 2.471 | 2 |
| 37.07 | 2.425 | 2 |
| 37.82 | 2.379 | 6 | sh = Shoulder
+ = Non-crystallographic MCM-49 peak

EXAMPLE 6

The product of Example 2 was subjected to the Alpha Test which indicated an Alpha value of 106.

EXAMPLE 7

To compare microporosity and effective pore openings between MCM-56, MCM-22, and MCM-49, hydrocarbon compounds with increasing molecular dimensions were adsorbed sequentially onto portions of calcined MCM-56, MCM-22, and MCM-49 products of the examples according to the procedure described by E. L. Wu, G. R. Landolt, and A. W. Chester in "New Developments in Zeolite Science and Technology", *Studies in Surface Science and Catalysis*, 28, 547 (1986), incorporated herein by reference as to this procedure. The dynamic sorption results of this investigation are presented in Table X below.

TABLE X

| | MCM-56 | | MCM-22 | | MCM-49 | |
|---|---|---|---|---|---|---|
| Sorbate | µl/g | sec. | µl/g | sec. | µl/g | sec. |
| n-Hexane | 79 | 17 | 120 | 12 | 114 | 10 |
| 2,2-Dimethyl-butane | 60 | 12 | 72 | 252 | 85 | 233 |
| 1,3,5-Trimethyl-benzene | 41 | 24 | 8 | 550 | undetectable | |

The sorption results indicate clear distinction between the tested materials. MCM-56 has at least 4 times the capacity of MCM-22 and MCM-49 for 1,3,5-trimethylbenzene, the most hindered hydrocarbon molecule used in this investigation. MCM-56 also demonstrates a much faster initial rate of sorption of 2,2-dimethylbutane (time required to sorb the first 15 mg of 2,2,-dimethylbutane/g of the sorbent at 80 Torr 2,2-dimethyl- butane in flowing helium at 373° K.) than MCM-22 or MCM-49. The corresponding times for representative MCM-56, MCM-22, and MCM-49 materials were 12, 252, and 233 seconds, respectively. The initial rate of sorption of n-hexane is the time required to sorb the first 40 mg n-hexane/g of sorbent and for 1,3,5-trimethyl- benzene, the time required to sorb the first 7 mg of 1,3,5-tri- methylbenzene/g of sorbent.

EXAMPLE 8

Example 1 was repeated, except that the reaction was stopped at 40 hours. X-ray analysis proved the product to be MCM-56.

EXAMPLE 9

A mixture of 258 grams of water, 20.5 grams of sodium aluminate solution (25.5% $Al_2O_3$ and 19.5% $Na_2O$), 51.4 grams of Ultrasil (VN3), and 50 grams of hexamethylene-imine (HMI) was reacted in a 600 ml stirred (400 rpm) autoclave at 154° C.

The reaction mixture had the following composition in mole ratios:

$SiO_2/Al_2O_3$=15

$OH^-/SiO_2$=0.17

$Na/SiO_2$=0.17

$HMI/SiO_2$=0.66

$H_2O/SiO_2$=19

The reaction was stopped at 130 hours. The product was filtered, washed with water to form a wet cake, and a portion was dried in an oven for 2 hours at 110° C.

Figure 3:
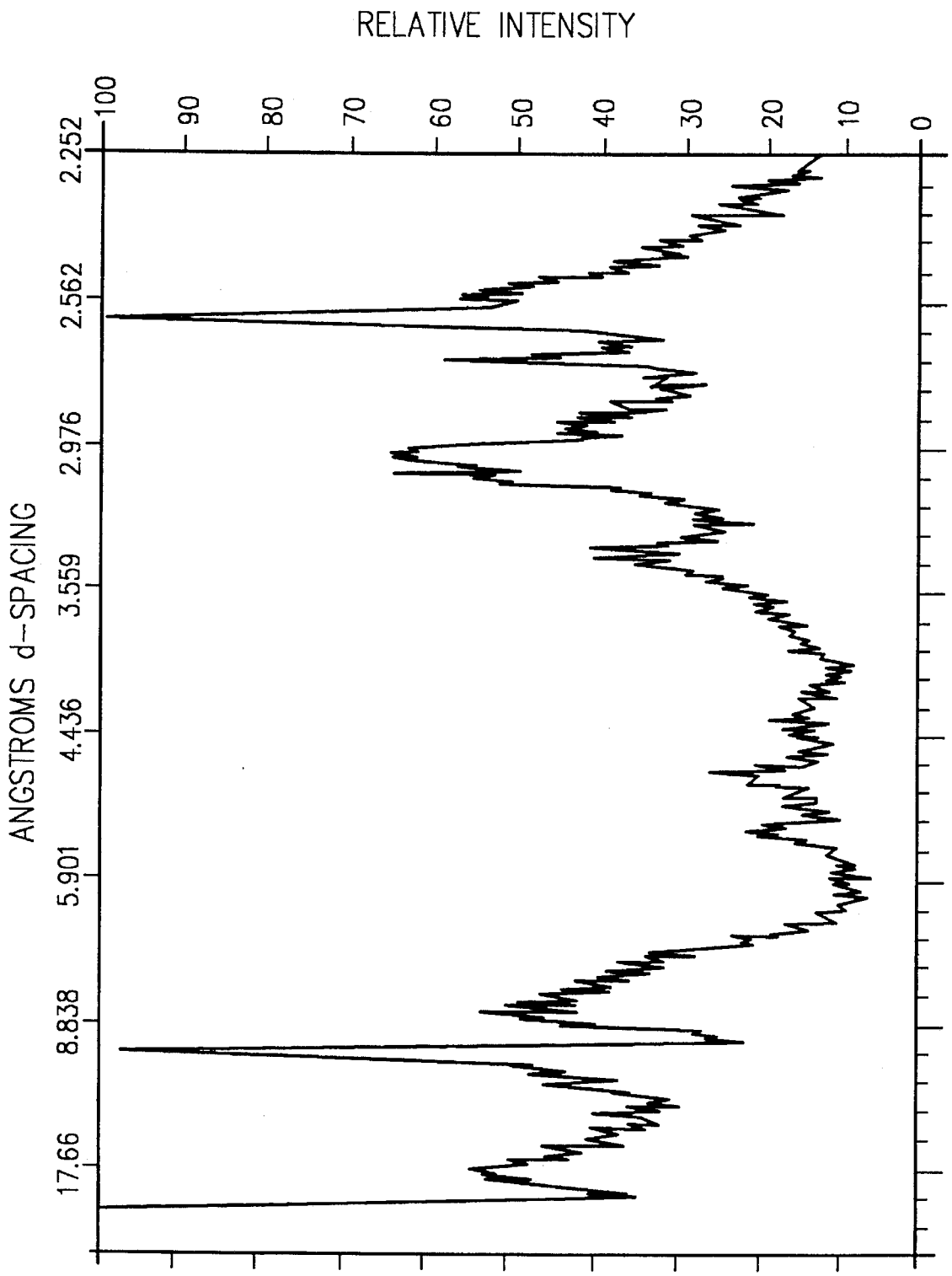
FIG. 3 shows the X-ray diffraction pattern of the dried product MCM-56 of Example 9.

A portion of the product wet cake and the dried portion were submitted for X-ray analysis and identified as MCM-56. The X-ray diffraction pattern of the dried material is presented below in Table XI and shown in FIG. 3.

TABLE XI

| 2 theta | d(A) | I/I$_o$ | Comments[a] |
|---|---|---|---|
| 4.1 | 21.6 | 30 | B |
| 6.67 | 13.25 | 23 | B, sh[b] |
| 6.96 | 12.70 | 24 | B |
| 7.16 | 12.35 | 80 | S |
| 8.9 | 9.9 | 21 | VVB |
| 12.86 | 6.88 | 14 | B |
| 13.98 | 6.33 | 7 | VB, sh |
| 14.33 | 6.18 | 15 | S |
| 15.85 | 5.59 | 7 | VVB |
| 19.93 | 4.45 | 25 | VVB |
| 21.95 | 4.05 | 42 | VB |
| 22.56 | 3.94 | 38 | B |
| 23.46 | 3.79 | 26 | VVB |
| 24.94 | 3.57 | 39 | S |
| 25.94 | 3.43 | 100 | S |
| 26.64 | 3.35 | 33 | B |

[a] S = sharp, B = broad, VB = very broad, VVB = very very broad, sh = shoulder
[b] Possible trace of MCM-22 precursor The chemical composition of the product of Example 9 was, in wt. %,

N=1.42

Na=2.3

$Al_2O_3$=9.3

$SiO_2$=70.7

Ash=82.3

The $SiO_2/Al_2O_3$ molar ratio of this product was 13.

EXAMPLE 10

Figure 4:
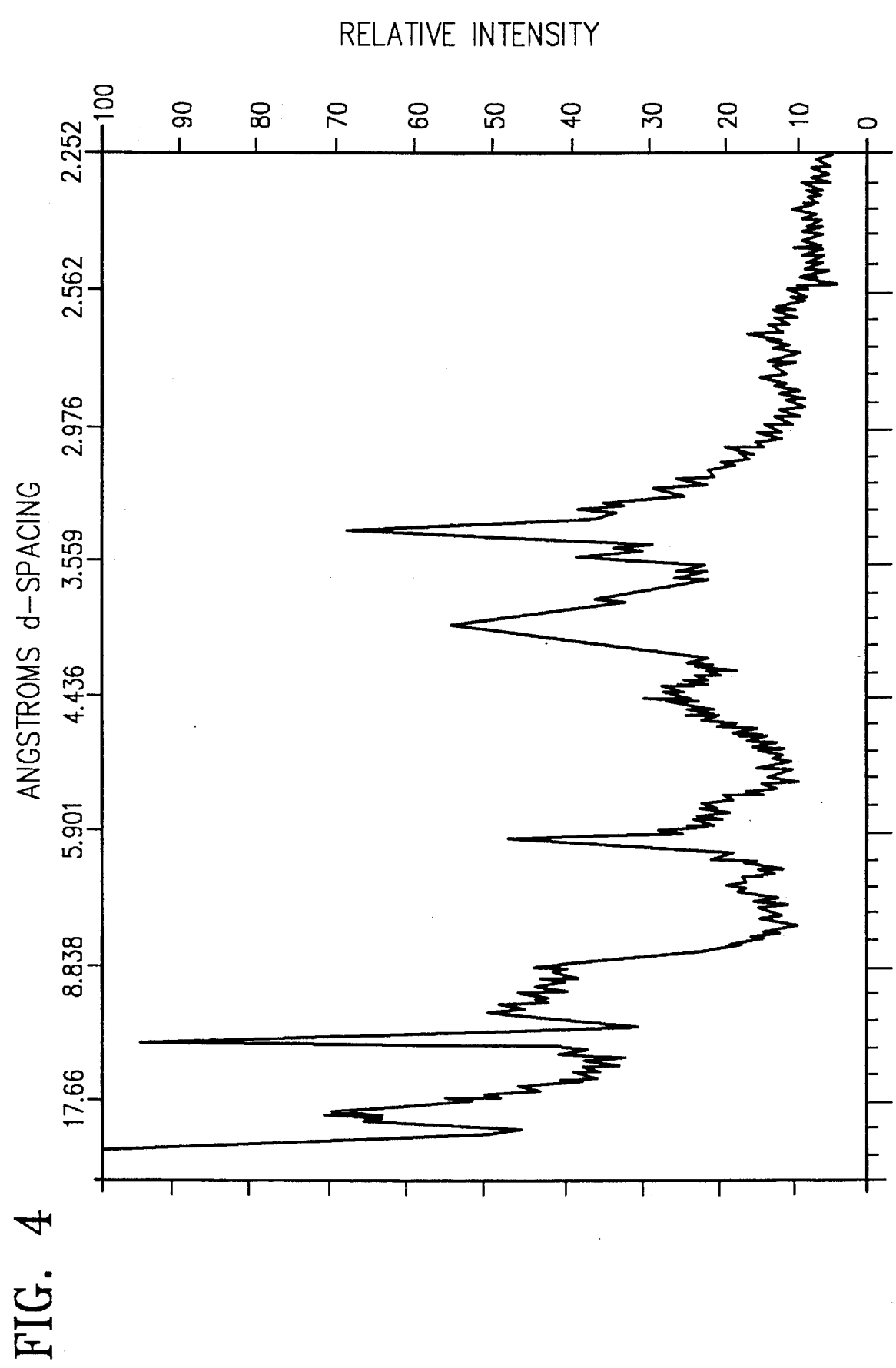
FIG. 4 shows the X-ray diffraction pattern of the calcined product MCM-56 of Example 10.

A portion of the dried sample from Example 9 was subjected to a three-fold exchange with a 1M ammonium nitrate solution. The solid was then heated in nitrogen at 482° C. for 3 hours, cooled to about 130° C., and then calcined in air at 538° C. for 5 hours. This material exhibited the X-ray diffraction pattern shown in Table XII and FIG. 4.

TABLE XII

| 2 theta | d(A) | I/I$_o$ | Comments[a] |
|---|---|---|---|
| 4.3 | 20.5 | 69 | B |
| 7.13 | 12.40 | 100 | S |
| 8.1 | 10.9 | 33 | VVB |

TABLE XII-continued

| 2 theta | d(A)  | I/I₀ | Comments[a] |
|---------|-------|------|-------------|
| 9.8     | 8.0   | 37   | VVB         |
| 12.79   | 6.92  | 12   | B           |
| 14.38   | 6.16  | 48   | S           |
| 15.78   | 5.62  | 17   | VVB         |
| 19.74   | 4.50  | 24   | VVB         |
| 22.45   | 3.96  | 69   | VVB         |
| 23.70   | 3.75  | 23   | VVB         |
| 25.10   | 3.55  | 36   | S           |
| 26.05   | 3.42  | 88   | S           |
| 26.86   | 3.32  | 27   | B           |
| 31.71   | 2.822 | 5    | S           |
| 33.34   | 2.687 | 9    | B           |
| 34.30   | 2.614 | 6    | VVB         |
| 36.40   | 2.468 | 5    | S           |
| 37.92   | 2.373 | 5    | S           |

[a] S = sharp, B = broad, VVB = very very broad

Figure 5:
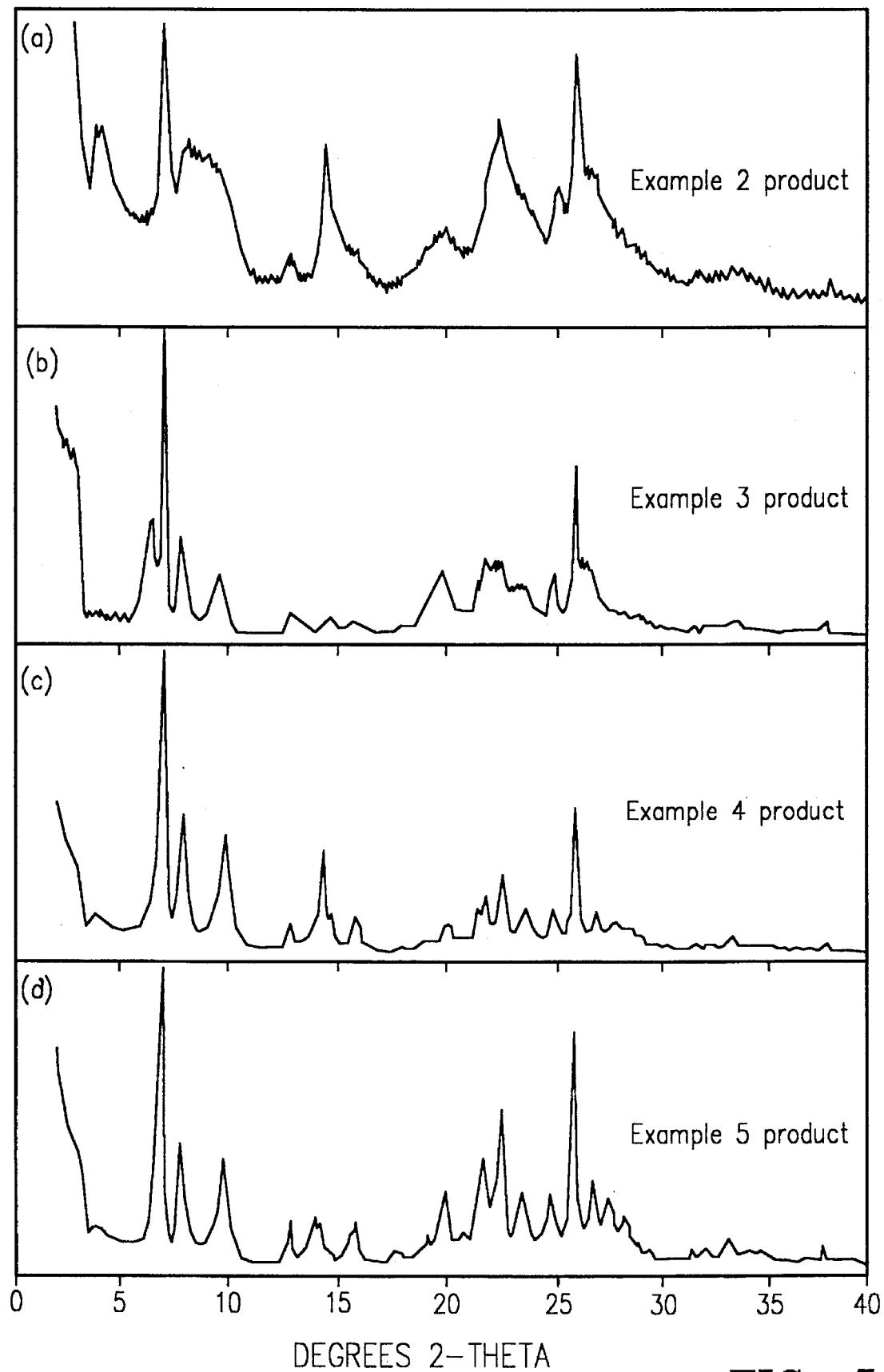
FIG. 5(*a*) shows the X-ray diffraction pattern of the Example 2 product.

The X-ray diffraction patterns of the product materials from Examples 2–5 are presented in FIG. 5. FIG. 5(a) shows the pattern of the MCM-56 product from Example 2; FIG. 5(b), the pattern of the product from Example 3. The pattern of the MCM-22 product from Example 4 is shown in FIG. 5(c), and the pattern shown in FIG. 5(d) is from the MCM-49 product of Example 5. These patterns are presented in this Figure in a manner by which comparison is facilitated. FIGS. 5(b) and (c) are from the as-synthesized layered material which transforms into crystalline MCM-22 upon calcination, and the crystalline MCM-22, respectively.

EXAMPLE 11

This Example describes the preparation of an MCM-56/alumina extrudate (1/16" diameter) comprising 65 wt. % MCM-56 and 35 wt. % alumina. 65 parts by weight of as-synthesized MCM-56, having a silica to alumina molar ratio of 18, and 35 parts by weight alumina (La Roche Versal 250) were mulled and extruded to form a 1/16" diameter extrudate. This extrudate was dried at 250° F. (121° C.). The dried extrudate was exchanged with an aqueous solution of $NH_4NO_3$ (10 ml solution/gram catalyst). The exchanged extrudate was rinsed with deionized water. The rinsed extrudate was first dried at 250° F. (121° C.), followed by calcination in nitrogen for 3 hours at 1000° F. (538° C.), and then calcined in air for 8 hours at 1000° F. (538° C.).

EXAMPLE 12

This Example describes the use of the MCM-56/alumina extrudate catalyst of Example 11 in the liquid phase synthesis of ethylbenzene (EB) from benzene and ethylene ($C_2$=). The experiments were conducted with a downflow, three-zone isothermal fixed-bed unit. One gram of this catalyst (1/16" length, 1/16" diameter) was diluted to 10 cc with 20–60 mesh quartz chips to make up the active bed. The reactor was operated at 200°–320° C., 500 psig, 5.5 benzene/$C_2$=molar ratio, and 1.1–2.8 $C_2$=WHSV. Ethylene conversion was determined by measuring unreacted $C_2$=offgas relative to feed $C_2$=. Offgases were analyzed on a Carle refinery gas analyzer and liquid products were analyzed on a Varian 3700 GC. Total material balances were 100±2%. The performance of MCM-56 for liquid phase EB synthesis is compared with MCM-22, MCM-49, and zeolite beta in FIG. 6 and Table XIII.

TABLE XIII

Ethylene Synthesis-Selectivity Comparison

| Catalyst/ 35% $Al_2O_3$ | Zeolite beta | MCM-22 | MCM-49 | MCM-56 |
|---|---|---|---|---|
| $C_2$= WHSV | 2.2 | 1.1 | 1.1 | 1.1 |
| Product dist., mol. % | | | | |
| EB    | 88.0 | 94.0 | 95.3 | 93.4 |
| DEB   | 10.6 | 5.7  | 4.5  | 6.2  |
| TEB+  | 1.1  | 0.2  | 0.1  | 0.3  |
| Σ     | 99.7 | 99.9 | 99.9 | 99.9 |
| xylenes | 0.00 | 0.00 | 0.00 | 0.00 |
| n-$C_3$-Bz + cumene | 0.00 | 0.00 | 0.00 | 0.00 |
| sec-$C_4$-Bz | 0.13 | 0.07 | 0.06 | 0.04 |
| other $C_9$+ aromatics | 0.14 | 0.02 | 0.02 | 0.05 |
| Σ (by-products) | 0.27 | 0.09 | 0.09 | 0.09 |

97+% $C_2$= conversion at 220° C., 500 psig, and 5.5 benzene/$C_2$= molar ratio.

Figure 6:
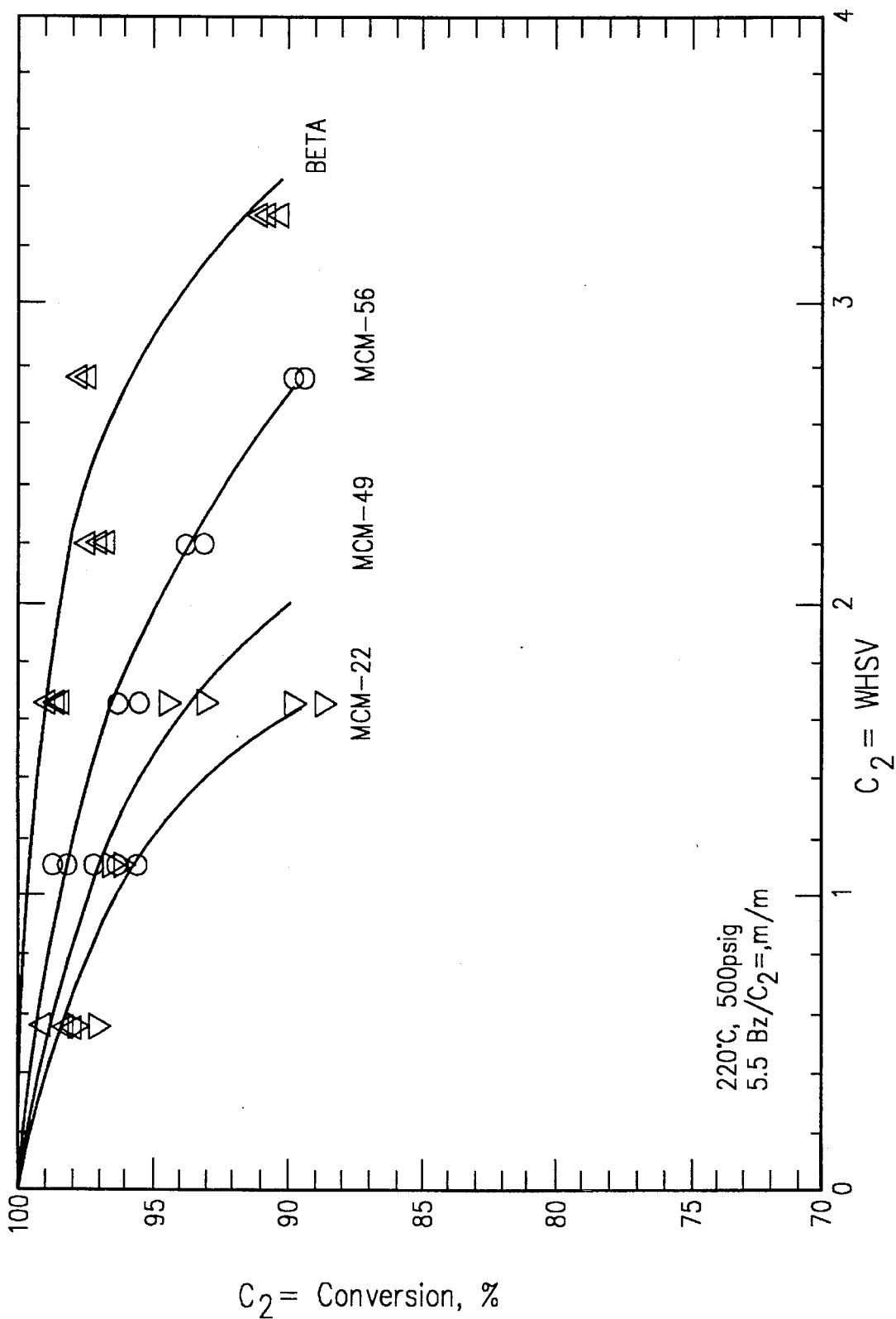
FIG. 6 is a graph showing a comparison of the activity of various zeolite catalysts in the liquid phase synthesis of ethylbenzene.

FIG. 6 indicates that the relative catalyst activity at constant $C_2$=conversion is MCM-22: MCM-49: MCM-56: zeolite beta=1.0: 1.2: 1.6: 2.2.

Table XIII indicates that at 97+% $C_2$=conversion, MCM-56's overall alkylation selectivity to EB and polyethylbenzene (99.9 mol %) is comparable to zeolite beta, MCM-22, and MCM-49. MCM-56's EB selectivity (93 mol %) is comparable to MCM-22 and MCM-49, but 5 mol % higher than zeolite beta (the most active catalyst tested). No deactivation was observed with MCM-56 during the two-week evaluation. Air regeneration did not affect MCM-56 activity. These results indicate that MCM-56 is more active than the MCM-22/-49 catalysts and more selective than zeolite beta for liquid phase EB synthesis. The combination of high activity and selectivity render MCM-56 a desirable liquid phase alkylation catalyst for EB.

EXAMPLE 13

This Example describes the use of the MCM-56/alumina extrudate catalyst of Example 11 in the liquid phase synthesis of cumene from benzene and propylene ($C_3$=). The experiments were conducted with a downflow, three-zone isothermal fixed-bed unit. One gram of this catalyst (1/16" length, 1/16" diameter) was diluted to 10 cc with 20–60 mesh quartz chips to make up the active bed. The reactor was operated at 300 psig, 3 benzene/$C_3$=molar ratio, 2.5–30 $C_3$=WHSV, and 50°–150° C. Propylene conversion was determined by measuring unreacted $C_3$=offgas relative to feed $C_3$=. Offgases were analyzed on a Carle refinery gas analyzer and liquid products were analyzed on a Varian 3700 GC. Total material balances were 100±2%.

Figure 7:
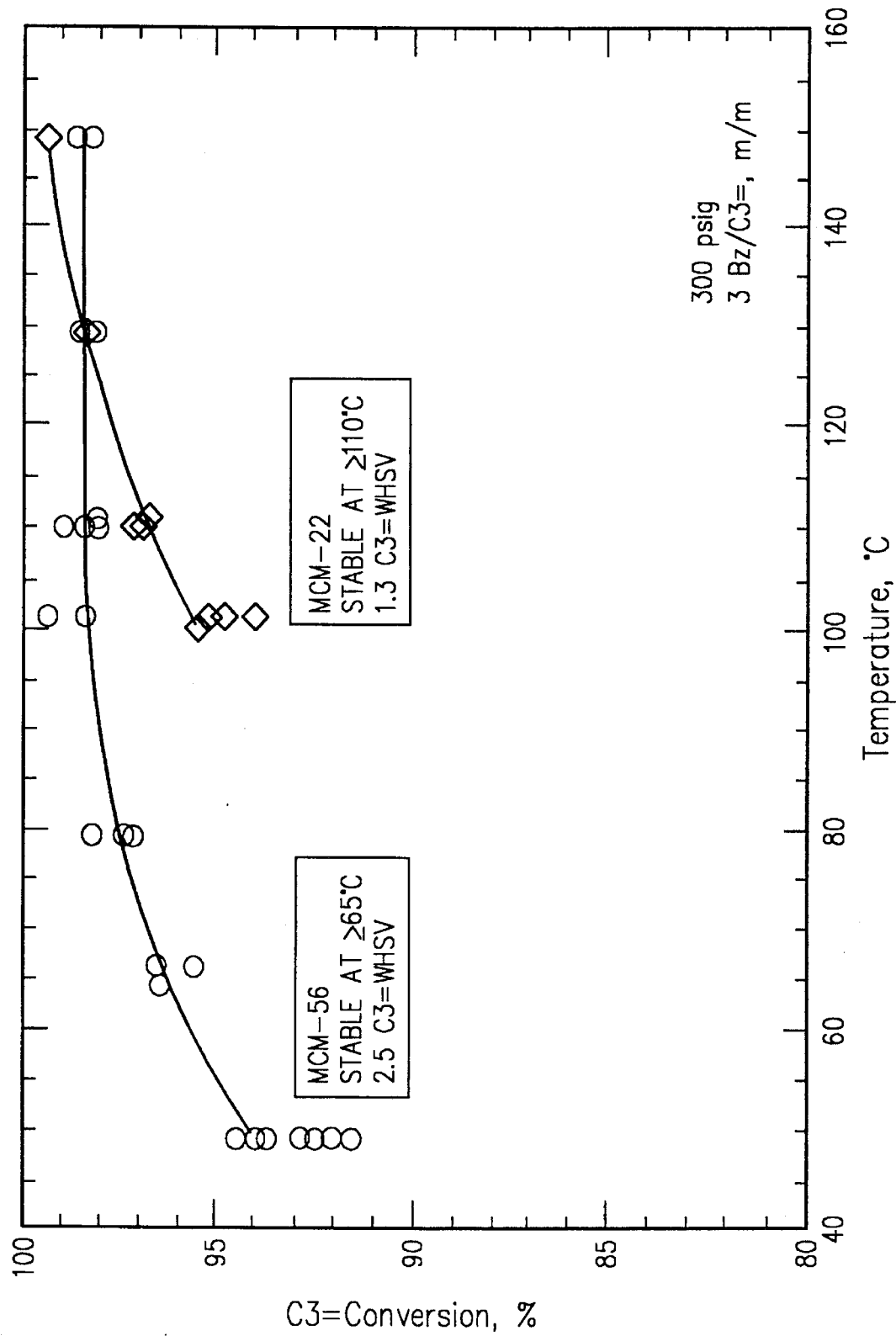
FIG. 7 is a graph showing a comparison of the activity of various zeolite catalysts in the liquid phase synthesis of cumene.
Figure 8:
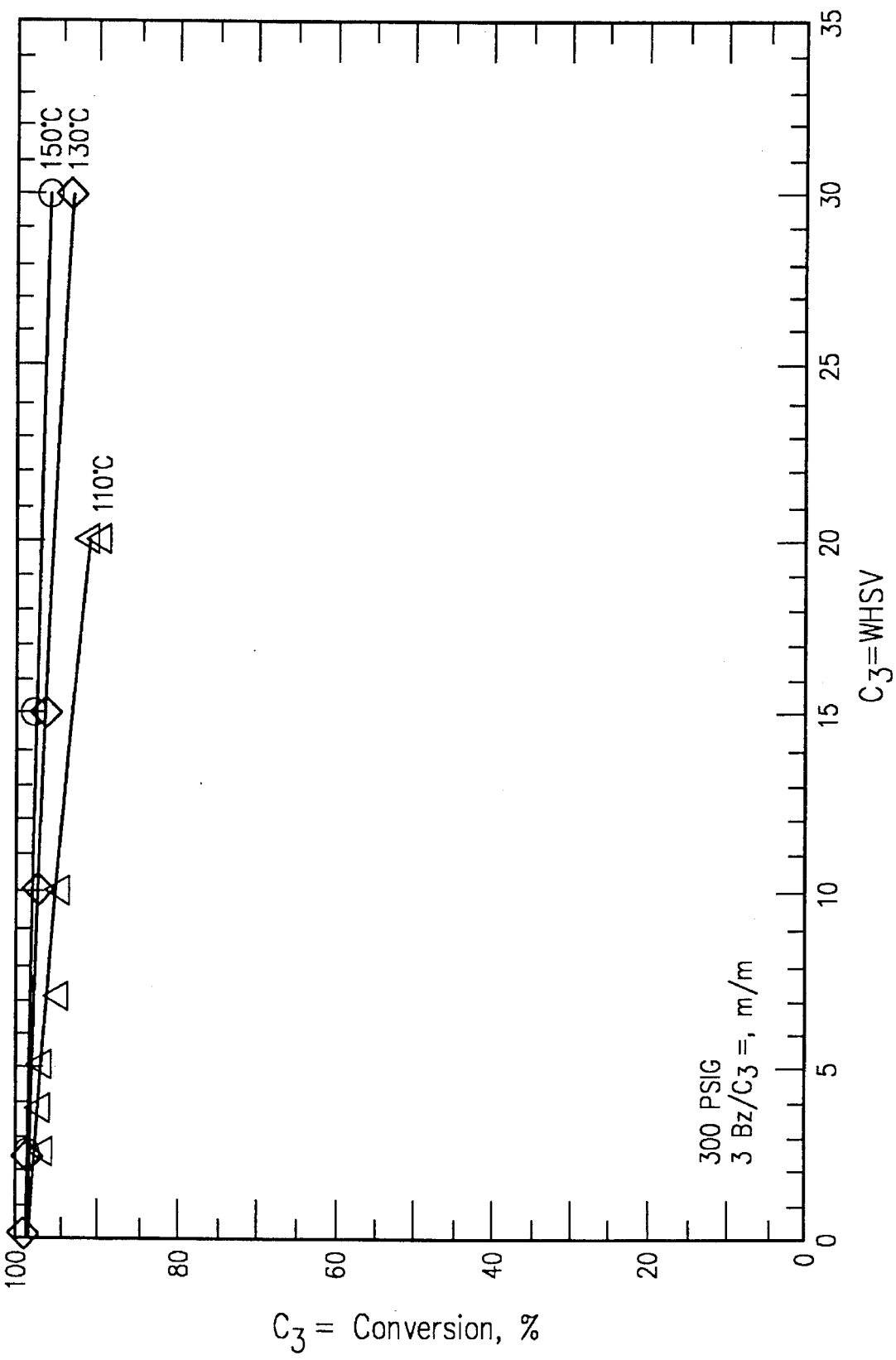
FIG. 8 is a graph showing propylene conversion as a function of propylene weight hourly space velocity for an MCM-56 catalyst in the liquid phase synthesis of cumene at various temperatures.

MCM-56 was very active for liquid phase cumene synthesis from benzene and $C_3$=. It provided a ~45° C. temperature advantage over MCM-22 (65° C. vs. 110° C.) for stable operation at 300 psig, 3 benzene/$C_3$=molar ratio, and 96% $C_3$=conversion (cf. FIG. 7). MCM-56 could be operated at 20–30 $C_3$=WHSV with 90+% $C_3$=conversion (cf. FIG. 8). Table XIV compares MCM-56's selectivity with MCM-22 and zeolite beta. In addition to its high activity for cumene synthesis, MCM-56 retained good product selectivity, comparable to MCM-22. Increasing $C_3$=WHSV from 2.5 to 10 hr⁻¹ had little effect on MCM-56's product selectivity. Zeolite beta performed poorly for cumene synthesis.

Although initially active, it deactivated rapidly due to $C_3^=$ oligomer formation. No deactivation was observed with MCM-56 during the four-week evaluation. Air regeneration did not affect MCM-56 activity.

TABLE XIV

Cumene Synthesis from Benzene and $C_3^=$

| Catalyst/ 35% $Al_2O_3$ | MCM-22 | Zeolite beta | MCM-56 | MCM-56 |
|---|---|---|---|---|
| Temp, °C. | 112 | 121 | 110 | 113 |
| Days on stream | 12.3 | 3.3 | 5.2 | 14.9 |
| $C_3^=$ conversion, % | 98.0 | 82.1 | 97.9 | 95.4 |
| $C_3^=$ WHSV | 1.3 | 2.5 | 2.5 | 10.0 |
| Benzene WHSV | 7 | 14 | 14 | 56 |
| Benzene/$C_3^=$ molar ratio | 3 | 3 | 3 | 3 |
| Product selectivity, wt. % | | | | |
| Cumene | 84.85 | 84.25 | 84.52 | 84.98 |
| Diisopropyl-benzene (DiPB) | 11.30 | 7.05 | 13.51 | 13.20 |
| Triisopropyl-benzene+ | 2.06 | 0.22 | 1.52 | 1.28 |
| Σ | 98.21 | 91.52 | 99.55 | 99.46 |
| $C_3^=$ oligomers | 1.80 | 8.44 | 0.45 | 0.52 |
| Aromatic lights | 0.00 | 0.04 | 0.00 | 0.00 |
| n-$C_3$-benzene | 0.006 | 0.008 | 0.008 | 0.008 |
| Σ (by-products) | 1.81 | 9.49 | 0.46 | 0.53 |
| DIPB/cumene, wt/wt | 0.133 | 0.084 | 0.160 | 0.127 |
| n-$C_3$-benzene/ cumene, ppm | 70 | 90 | 90 | 90 |

What is claimed is:

1. A process for preparing short chain alkyl aromatic compounds, said process comprising the steps of:
   (a) contacting at least one alkylatable aromatic compound with at least one alkylating agent possessing an alkylating aliphatic group having from 1 to 5 carbon atoms under sufficient reaction conditions and in the presence of an alkylation catalyst to provide an alkylated aromatic product possessing at least one alkyl group derived from said alkylating agent, said alkylated aromatic product comprising monoalkylated product and polyalkylated product, said alkylation catalyst comprising synthetic porous crystalline MCM-56; and
   (b) contacting said polyalkylated product from step (a) with an aromatic compound of the same formula as the alkylatable aromatic compound of step (a) under sufficient reaction conditions and in the presence of a transalkylation catalyst to provide further monoalkylated product.

2. A process according to claim 1, wherein steps (a) and (b) take place in separate reactors.

3. A process according to claim 2, wherein said transalkylation catalyst comprises a zeolite selected from the group consisting of MCM-22, zeolite X, zeolite Y, zeolite beta and mordenite.

4. A process according to claim 3, wherein said alkylatable aromatic compound is benzene, said alkylating agent is ethylene and said monoalkylated product is ethylbenzene.

5. A process according to claim 4, wherein step (a) takes place under liquid phase conditions.

6. A process according to claim 5, wherein said transalkylation catalyst of step (b) comprises zeolite beta.

7. A process according to claim 3, wherein said alkylatable aromatic compound is benzene, said alkylating agent is propylene and said monoalkylated product is cumene.

8. A process according to claim 7, wherein step (a) takes place under liquid phase conditions.

9. A process according to claim 8, wherein said transalkylation catalyst of step (b) comprises zeolite beta.

10. A process according to claim 1, wherein the synthetic porous crystalline MCM-56 has a composition comprising the molar relationship

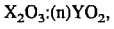

$$X_2O_3:(n)YO_2,$$

wherein n is less than about 35, X is a trivalent element and Y is a tetravalent element.

11. A process according to claim 10, wherein X is a trivalent element selected from the group consisting of aluminum, boron, iron, gallium, and mixtures thereof; and Y is a tetravalent element selected from the group consisting of silicon, titanium, germanium, and mixtures thereof.

12. A process according to claim 10, wherein n is from about 5 to about 25, and wherein said MCM-56 material has a sorption capacity for 1,3,5-trimethylbenzene of at least about 35 μl/gram of calcined synthetic material, an initial uptake of 15 mg of 2,2-dimethylbutane/gram of calcined synthetic material of less than about 20 seconds, and an X-ray diffraction pattern for the calcined synthetic material having d-spacing maxima at 12.4±0.2, 9.9±0.3, 6.9±0.1, 6.2±0.1, 3.55±0.07, and 3.42±0.07 Angstroms.

13. A process according to claim 12, wherein n is from about 10 to about 20.

14. A process according to claim 13, wherein X comprises aluminum and Y comprises silicon.

\* \* \* \* \*